Jan. 5, 1926.

A. J. CORMIER 1,568,269

EXPANSIBLE PACKING MECHANISM FOR PISTONS

Filed July 24, 1923

INVENTOR.
Alfred Jules Cormier
BY
ATTORNEY.

Patented Jan. 5, 1926.

1,568,269

UNITED STATES PATENT OFFICE.

ALFRED JULES CORMIER, OF LONG BEACH, CALIFORNIA.

EXPANSIBLE PACKING MECHANISM FOR PISTONS.

Application filed July 24, 1923. Serial No. 653,612.

*To all whom it may concern:*

Be it known that I, ALFRED JULES CORMIER, a citizen of the United States, residing at Long Beach, in the county of Los Angeles and State of California, have invented new and useful Improvements in Expansible Packing Mechanism for Pistons, of which the following is a specification.

This invention has relation more particularly to a novel construction for expanding the expansible packing of pump pistons.

A main object of this invention is to provide a novel piston construction whereby it will be possible to instantly expand or adjust the piston packing without the necessity of removing the same from the piston cylinder or stopping the operation of the pump.

A further object is to provide a pump piston packing expanding construction which will evenly expand the piston packing element throughout its entire cross sectional area.

The invention aims as a further object to provide a device of the above type which shall be simple in construction, inexpensive to manufacture and practical and efficient in use.

Further objects and advantages will at once be apparent from the following description in which reference is had to the drawings accompanying the same, wherein.

Figure 1:
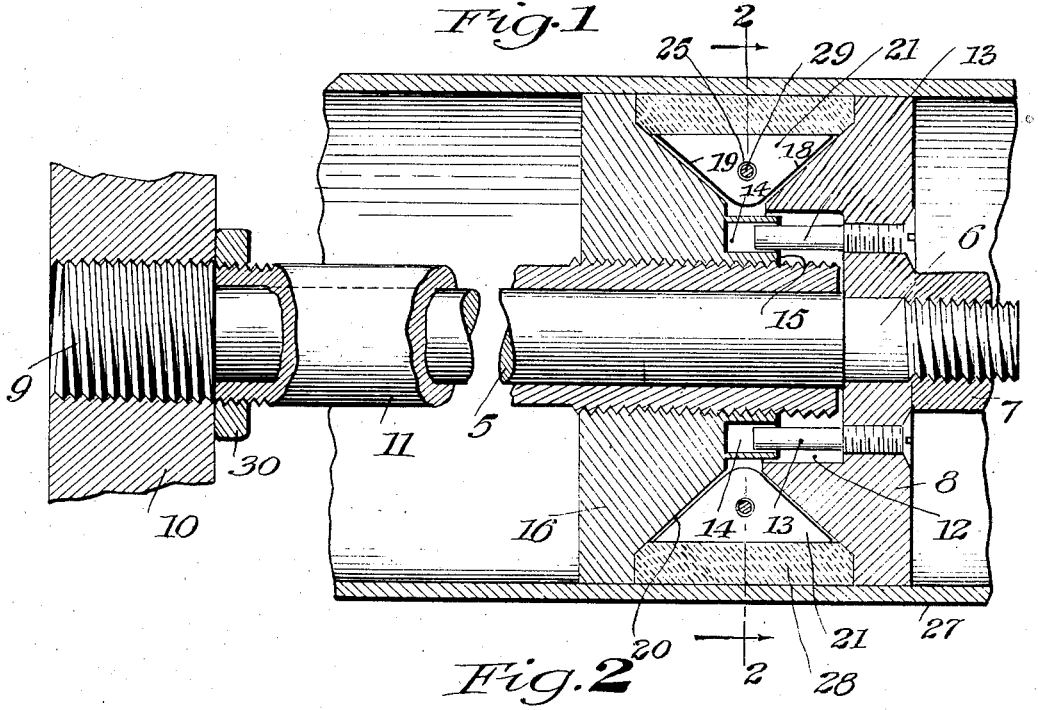
Fig. 1 is a central longitudinal section through my improved piston construction, mounted in a pump cylinder.

Referring specifically to the accompanying drawings, the numeral 5 designates the piston rod having a reduced threaded outer end 6 for the reception of a nut 7, for rigidly securing the stationary portion of piston head 8 thereto. The opposite end of rod 5 is enlarged and threaded as at 9 for detachably engaging the pump crosshead 10. Mounted on piston rod 5 is a sleeve 11 exteriorly threaded at both of its ends, one end extending into centrally disposed circular recess 12 formed in piston head portion 8, while its opposite end abuts against the enlarged threaded end 9 of the piston rod. Piston head portion 8 is coniform and is provided with a plurality of threaded bores for the reception of countersunk screws 13 whose ends terminate within circular recesses or bores 14, formed on the inner face 15 of a movable piston element 16, whose exterior surface is exactly the same as piston head 8, the conical surfaces of both members being oppositely disposed as shown in Fig. 1 of the drawings.

Figure 2:
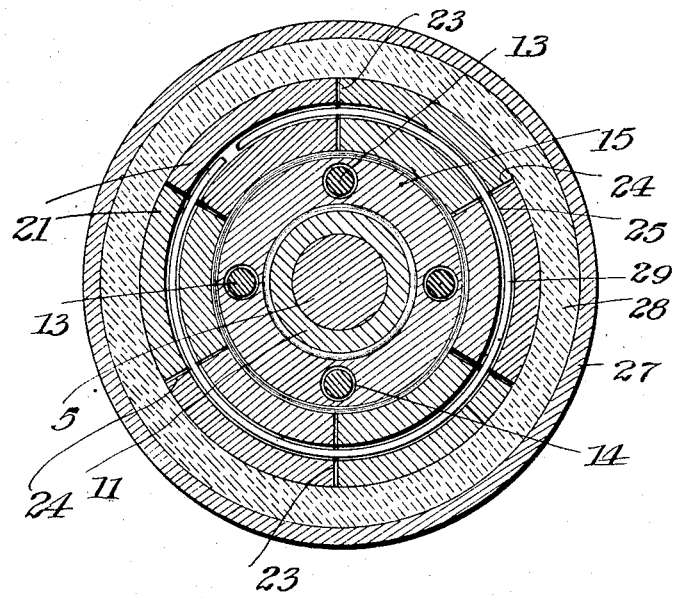
Fig. 2 is a cross sectional view of the piston taken on line 2—2 of Fig. 1.

Disposed within the annular wedge shaped recess 20, formed by the piston elements, are a plurality of packing expanding members 21, their side walls 18, 19, converging rearwardly, and their end walls 23, 24, extending radially as clearly shown in Fig. 2 of the drawings. Each of the expanding members 21 are provided with a segmental centrally disposed aperture 25 which extends between the end wall 23, 24, the apertures of each member registering with each other when the members are assembled in the annular recess 20, a spring ring 29 or metal cable of less diameter than the apertures being disposed therein to hold said members in position when the device is assembled.

Mounted in the annular packing space between the front segmental walls 26, and the inner peripheral wall of the pump liner 27, is an annular expansible packing ring 28, formed of rubber or similar expansible material.

When it is desired to expand the packing ring 28, the lock nut 30 mounted on the outer threaded end of sleeve 11, which abuts against the inner face of the pump crosshead 10, is loosened to permit of its rotation, a "Stillson" wrench is then applied to the sleeve to move piston member 16 forwardly to expand the packing ring 28, the studs 13 extending into the recesses 14 formed in the inner face of member 16 preventing a turning movement. After the packing ring has been expanded to the desired extent, the lock nut 30 is rotated rearwardly against the crosshead 10, to hold the sleeve against accidental rotation during the operation of the pump.

From the above description it will be observed that I have provided a novel construction, whereby it will be possible to expand the pump packing to the desired extent without dismantling the entire structure. Moreover, as piston element 16 is moved forwardly against the stationary portion 8 the wedge shaped expanding members will be forced outwardly and against the inner peripheral surface of the expansible packing ring, thus causing the entire contacting surface of the packing ring to evenly contact with the inner peripheral surface of the pump liner.

What I claim is—

1. In a piston packing expander the combination of a piston rod, of a stationary coniform piston element carried thereby, a sleeve carried by said piston rod having an exterior threaded end portion, a movable coniform piston element mounted on the threaded end of said sleeve, an expansible packing mounted in the space between said coniform piston elements, and a plurality of packing expanding members arranged behind said packing and between said piston elements for expanding said packing on a forward movement of said movable piston element.

2. In a piston packing expander the combination of a piston rod, of a stationary coniform piston element carried thereby, a sleeve carried by said piston rod, a reciprocating coniform piston element mounted on said sleeve and in threaded relation therewith, means to prevent the rotation of said reciprocal piston element on a rotation of said sleeve, an expansible element mounted in the space between said piston element, and an expanding means disposed behind said packing element for expanding the same on a forward reciprocation of said last named piston element.

3. In a piston packing expander the combination of a piston rod, of a stationary coniform piston head carried thereby, a sleeve mounted on said piston rod, a movable coniform piston element in threaded engagement with said sleeve, an expansible packing mounted between the coniform piston members, a plurality of packing expanding members mounted between said piston members and behind said expansible packing, whereby on a forward rotation of said sleeve the movable piston element will be reciprocated to operate said expanding members to expand said packing, and means connected to said stationary piston head and engaging said movable piston element to prevent a rotary movement of the same when the sleeve is rotated.

In witness that I claim the foregoing I have hereunto subscribed my name this 6th day of July, 1923.

ALFRED JULES CORMIER.